United States Patent
Miyairi et al.

(10) Patent No.: US 10,857,498 B2
(45) Date of Patent: Dec. 8, 2020

(54) PLUGGED HONEYCOMB STRUCTURE

(71) Applicant: NGK INSULATORS, LTD., Nagoya (JP)

(72) Inventors: Yukio Miyairi, Nagoya (JP); Kazuto Miura, Nagoya (JP); Tomohiro Iida, Nagoya (JP); Takashi Aoki, Nagoya (JP); Osamu Yasui, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 580 days.

(21) Appl. No.: 15/704,352

(22) Filed: Sep. 14, 2017

(65) Prior Publication Data
US 2018/0104636 A1    Apr. 19, 2018

(30) Foreign Application Priority Data
Oct. 19, 2016 (JP) .................... 2016-205265

(51) Int. Cl.
*B01D 46/24* (2006.01)
*B01D 46/00* (2006.01)
*F01N 3/022* (2006.01)

(52) U.S. Cl.
CPC ....... *B01D 46/247* (2013.01); *B01D 46/0063* (2013.01); *B01D 46/2429* (2013.01); *F01N 3/0222* (2013.01); *B01D 2046/2481* (2013.01); *B01D 2046/2492* (2013.01);
(Continued)

(58) Field of Classification Search
CPC .............. F01N 3/0222; B01D 39/2068; B01D 46/2418; B01D 46/2451; B01D 46/247
See application file for complete search history.

(56) References Cited

U.S. PATENT DOCUMENTS

| 4,448,828 A | * | 5/1984 | Mochida ............... B01D 53/86 |
| | | | 428/34.4 |
| 7,244,284 B2 | * | 7/2007 | Miwa ..................... B01D 45/16 |
| | | | 422/177 |

(Continued)

FOREIGN PATENT DOCUMENTS

| JP | 2004-000896 A1 | 1/2004 |
| WO | 2010/113586 A1 | 10/2010 |
| WO | 2016/013513 A1 | 1/2016 |

OTHER PUBLICATIONS

Japanese Office Action (with English translation), Japanese Application No. 2016-205265, dated Jun. 9, 2020 (6 pages).

*Primary Examiner* — Robert A Hopkins
(74) *Attorney, Agent, or Firm* — Burr & Brown, PLLC

(57) ABSTRACT

A honeycomb structure body is constituted of a circumferential region including the outermost circumference in a cross section of the honeycomb structure body which is perpendicular to an extending direction of cells, and a central region excluding the circumferential region. The circumferential region includes a specific circumferential region in which pressure loss with soot when an amount of the deposited soot is 4 g/L is higher than the pressure loss with soot of the central region as much as 15% or more and in which an open frontal area of the circumferential region is the same as or larger than an open frontal area of the central region. In the cross section of the honeycomb structure body, a ratio of an area of the specific circumferential region is 5% or more to a total area of the circumferential region and the central region.

7 Claims, 8 Drawing Sheets

(52) U.S. Cl.
CPC ...... *B01D 2279/30* (2013.01); *F01N 2330/06* (2013.01); *F01N 2330/32* (2013.01); *Y02T 10/12* (2013.01)

(56) References Cited

U.S. PATENT DOCUMENTS

| | | | | |
|---|---|---|---|---|
| 8,092,565 | B2 * | 1/2012 | Yamada | B01D 46/2455 422/177 |
| 9,932,873 | B2 * | 4/2018 | Aoki | B01D 46/2429 |
| 9,993,813 | B2 * | 6/2018 | Omiya | C04B 41/87 |
| 2005/0076627 | A1 | 4/2005 | Itou et al. | |
| 2005/0235622 | A1 * | 10/2005 | Cutler | B01D 46/2429 55/523 |
| 2008/0155952 | A1 * | 7/2008 | Okazaki | B01D 46/2429 55/523 |
| 2009/0004073 | A1 * | 1/2009 | Gleize | F01N 3/0222 422/180 |
| 2011/0230335 | A1 * | 9/2011 | Yamada | C04B 35/6263 502/100 |
| 2012/0017554 | A1 | 1/2012 | Iwasaki et al. | |
| 2014/0041350 | A1 * | 2/2014 | Aoki | B01D 46/247 55/529 |
| 2014/0298779 | A1 * | 10/2014 | Miyairi | F01N 3/022 60/298 |
| 2014/0311112 | A1 * | 10/2014 | Toyoshima | B01D 46/2474 55/529 |
| 2015/0037220 | A1 * | 2/2015 | Goto | F01N 3/0222 422/171 |
| 2015/0037221 | A1 * | 2/2015 | Shibata | B01D 53/94 422/177 |
| 2015/0037532 | A1 * | 2/2015 | Shibata | B01D 46/247 428/117 |
| 2017/0197168 | A1 | 7/2017 | Ishibata et al. | |

* cited by examiner

PLUGGED HONEYCOMB STRUCTURE

The present application is an application based on JP-2016-205265 filed on 19 Oct. 2016 with Japan Patent Office, the entire contents of which are incorporated herein by reference.

BACKGROUND OF THE INVENTION

Field of the Invention

The present invention relates to a plugged honeycomb structure, and more particularly, it relates to a plugged honeycomb structure which is excellent in regeneration efficiency during regeneration to burn and remove soot trapped by partition walls.

Description of the Related Art

From the viewpoints of influence on the global environment and resource saving, improvement of car fuel efficiency has been required in recent years. Consequently, internal combustion engines such as a direct injection type gasoline engine and a diesel engine, which are excellent in heat efficiency, have a tendency to be used as power sources for cars.

On the other hand, these internal combustion engines have the problem of generation of cinders during combustion of fuel. From the viewpoint of the atmospheric environment, there are required countermeasures to remove harmful components included in an exhaust gas and to simultaneously prevent particulate matter (hereinafter referred to as "PM" sometimes) such as soot from being discharged to the atmospheric air.

In particular, regulations on removal of the PM emitted from the diesel engine have a tendency to be worldwide strengthened. Furthermore, attention is attracted to use of a wall flow type exhaust gas purifying filter of a honeycomb structure as a trapping filter to remove the PM (hereinafter referred to as "DPF (a diesel particulate filter)" sometimes), and various systems have been suggested. The above DPF is usually a structure in which porous partition walls define a plurality of cells forming through channels for a fluid, and the cells are alternately plugged, whereby the porous partition walls forming the cells perform a function of the filter. A pillar-shaped structure in which the porous partition walls define the plurality of cells will be referred to as "a honeycomb structure" sometimes. Furthermore, the honeycomb structure in which open ends of the formed cells are plugged with plugging portions will be referred to as "a plugged honeycomb structure" sometimes. The plugged honeycomb structure is broadly used as a trapping filter such as the DPF. When an exhaust gas containing the particulate matter flows into the plugged honeycomb structure from an inflow end face (a first end face) of the plugged honeycomb structure and when the exhaust gas passes through the partition walls, the particulate matter in the exhaust gas is filtered, and the purified exhaust gas is emitted from an outflow end face (a second end face) of the plugged honeycomb structure.

Furthermore, there has also been suggested a plugged honeycomb structure or the like where a sectional shape of inflow cells into which the exhaust gas flows is different from a sectional shape of outflow cells from which the exhaust gas passed through partition walls is emitted (e.g., see Patent Document 1). Here, the sectional shape of the cells is a cell shape appearing in a cross section perpendicular to a cell extending direction.

In a honeycomb filter such as the DPF, pressure loss gradually increases due to the PM deposited in the filter with an elapse of time, and hence regeneration is performed to burn and remove the PM deposited in the honeycomb filter at a regular interval. As a method of regenerating the DPF, for example, there is known a regenerating method of raising a temperature of the exhaust gas emitted from the engine and heating the DPF by use of the high-temperature exhaust gas.

[Patent Document 1] JP-A-2004-000896

SUMMARY OF THE INVENTION

A conventional plugged honeycomb structure has the problem of a low regeneration efficiency during regeneration to burn and remove PM deposited in a filter.

The present invention has been developed in view of such problems of a conventional technology. According to the present invention, there is provided a plugged honeycomb structure which is excellent in regeneration efficiency during regeneration to burn and remove soot trapped by partition walls.

The present inventors have carried out various studies on reasons why the above-mentioned regeneration efficiency is low in the conventional plugged honeycomb structure. The present inventors have found that during the regeneration of the conventional plugged honeycomb structure, a temperature of a circumferential portion of the honeycomb structure hardly rises and that unburned soot in this circumferential portion becomes a large factor for deterioration of the regeneration efficiency, and the present inventors have completed the present invention. Consequently, according to the present invention, there is provided a plugged honeycomb structure mentioned below.

According to a first aspect of the present invention, a plugged honeycomb structure is provided including a pillar-shaped honeycomb structure body having porous partition walls arranged to surround a plurality of cells extending from an inflow end face to an outflow end face and forming through channels for a fluid; and plugging portions each of which is disposed in an end portion of the cell on the side of one of the inflow end face and the outflow end face, wherein the honeycomb structure body is constituted of a circumferential region including the outermost circumference in a cross section of the honeycomb structure body which is perpendicular to an extending direction of the cells, and a central region disposed in a central portion of the cross section excluding the circumferential region, the circumferential region includes a specific circumferential region in which pressure loss with soot when an amount of the deposited soot is 4 g/L is higher than the pressure loss with soot of the central region as much as 15% or more and in which an open frontal area of the circumferential region is the same as or larger than an open frontal area of the central region, and in the cross section of the honeycomb structure body which is perpendicular to the cell extending direction, a ratio of an area of the specific circumferential region is 5% or more to a total area of the honeycomb structure body.

According to a second aspect of the present invention, the plugged honeycomb structure according to the above first aspect is provided, wherein the cells including the plugging portions arranged in the end portions on the outflow end face side are defined as inflow cells, and the cells including the plugging portions arranged in the end portions on the inflow end face side are defined as outflow cells, and in a region other than the specific circumferential region of the honeycomb structure body, a shape of the inflow cells in the cross section perpendicular to the cell extending direction is hexagonal, a shape of the outflow cells in the cross section perpendicular to the cell extending direction is square, the plurality of cells have a structure in which four inflow cells surround one outflow cell so that one side of the predetermined inflow cell and one side of the adjacent outflow cell have the same length and are disposed in parallel with each other, a distance a that is a distance between the partition wall forming a first side of the outflow cell and the partition wall forming a second side facing the first side of the outflow cell is in a range in excess of 0.8 mm and smaller than 2.4 mm, and a ratio, to the distance a, of a distance b that is a distance between the partition wall forming a third side of the inflow cell parallel and adjacent to the one side of the outflow cell and the partition wall forming a fourth side facing the third side of the inflow cell is in a range in excess of 0.4 and smaller than 1.1.

According to a third aspect of the present invention, the plugged honeycomb structure according to the above second aspect is provided, wherein the inflow cell in the region other than the specific circumferential region of the honeycomb structure body further includes a dividing wall connecting a central portion of the third side to a central portion of the fourth side in a direction perpendicular to the cell extending direction.

According to a fourth aspect of the present invention, the plugged honeycomb structure according to the above second or third aspects is provided, wherein the region other than the specific circumferential region of the honeycomb structure body is the central region.

According to a fifth aspect of the present invention, the plugged honeycomb structure according to any one of the above second to fourth aspects is provided, wherein in the specific circumferential region of the honeycomb structure body, shapes of the cells in the cross section perpendicular to the cell extending direction are quadrangular or are different between the inflow cell and the outflow cell.

According to a sixth aspect of the present invention, the plugged honeycomb structure according to any one of the above first to fifth aspects is provided, wherein in the honeycomb structure body, the circumferential region and the central region are made of the same material.

According to a seventh aspect of the present invention, the plugged honeycomb structure according to the above sixth aspect is provided, wherein in the honeycomb structure body, the circumferential region and the central region are monolithically constituted by the same material.

According to a plugged honeycomb structure of the present invention, a honeycomb structure body having porous partition walls is constituted so that a circumferential region is different from a central region in pressure loss with soot. In particular, the circumferential region includes a specific circumferential region constituted to have pressure loss with soot which is higher than the pressure loss with soot of the central region as much as 15% or more. Furthermore, the specific circumferential region is constituted so that its open frontal area is the same as or larger than an open frontal area of the central region. Consequently, in the plugged honeycomb structure of the present invention, the specific circumferential region is constituted so that soot does not accumulate as compared with the central region. In consequence, in the plugged honeycomb structure of the present invention, a regeneration efficiency can improve as compared with a conventional plugged honeycomb structure.

DESCRIPTION OF THE PREFERRED EMBODIMENTS

Figure 1:
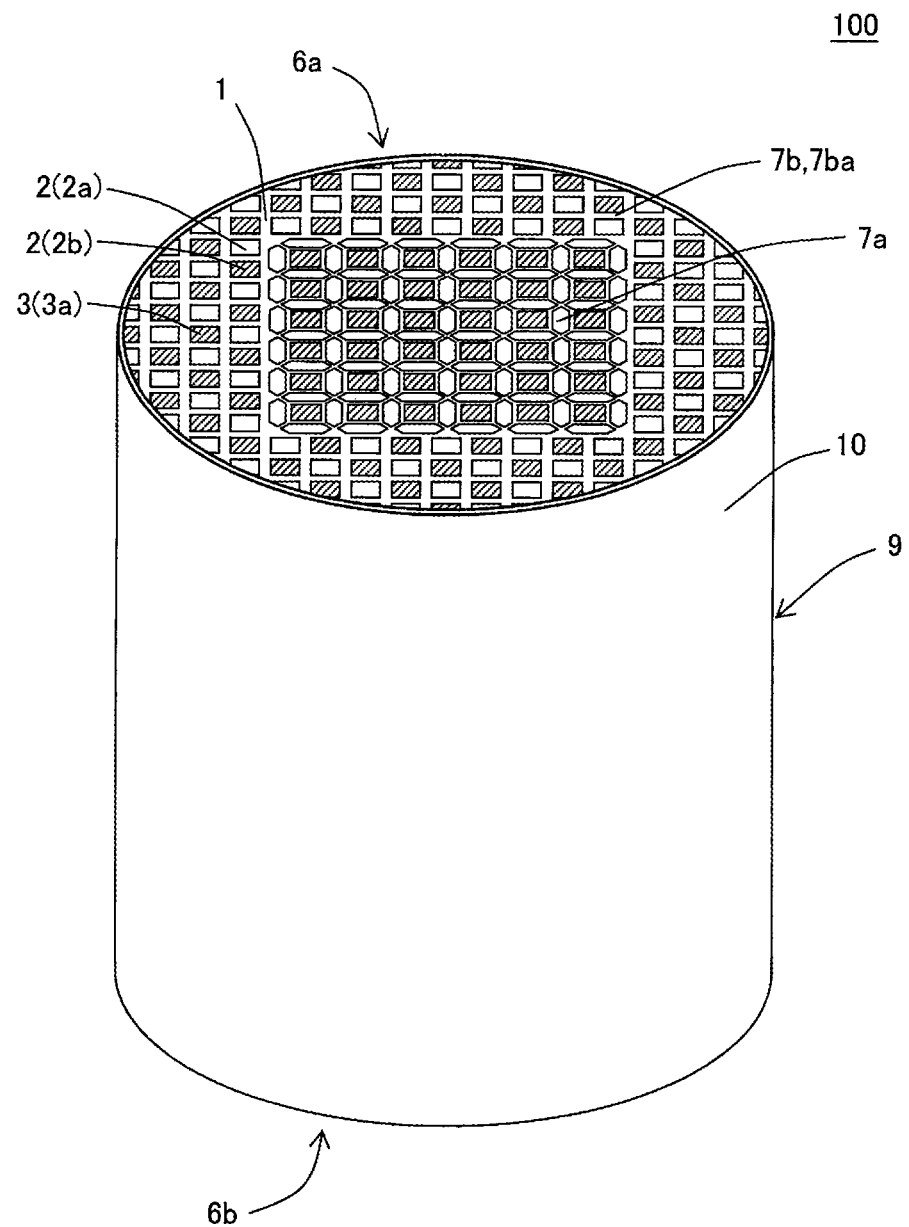
FIG. 1 is a perspective view schematically showing one embodiment of a plugged honeycomb structure of the present invention and seen from an inflow end face side.

Hereinafter, embodiments of the present invention will be described, but the present invention is not limited to the following embodiments. Therefore, it should be understood that the following embodiments to which changes, improvements and the like are suitably added also fall in the scope of the present invention on the basis of ordinary knowledge of a person skilled in the art without departing from the gist of the present invention.

(1) Plugged Honeycomb Structure:

As shown in FIG. 1 to FIG. 9, a first embodiment of a plugged honeycomb structure of the present invention is a plugged honeycomb structure 100 including a honeycomb structure body 9 and plugging portions 3. The honeycomb structure body 9 has a pillar shape and includes porous partition walls 1 arranged to surround a plurality of cells 2 extending from an inflow end face 6a to an outflow end face 6b and forming through channels for a fluid. Each plugging portion 3 is disposed in an end portion of the cell 2 on the side of one of the inflow end face 6a and the outflow end face 6b. The plugged honeycomb structure 100 further includes, at its circumference, an outer wall 10 disposed to surround the honeycomb structure body 9.

Figure 2:
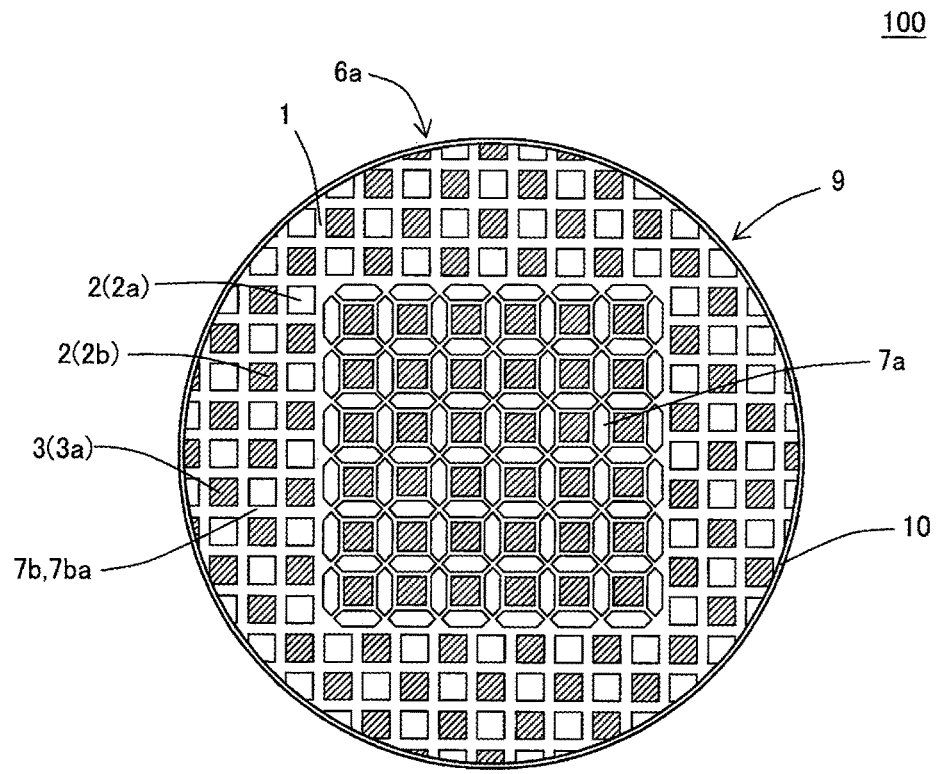
FIG. 2 is a plan view seen from the inflow end face side of the plugged honeycomb structure shown in FIG. 1.
Figure 3:
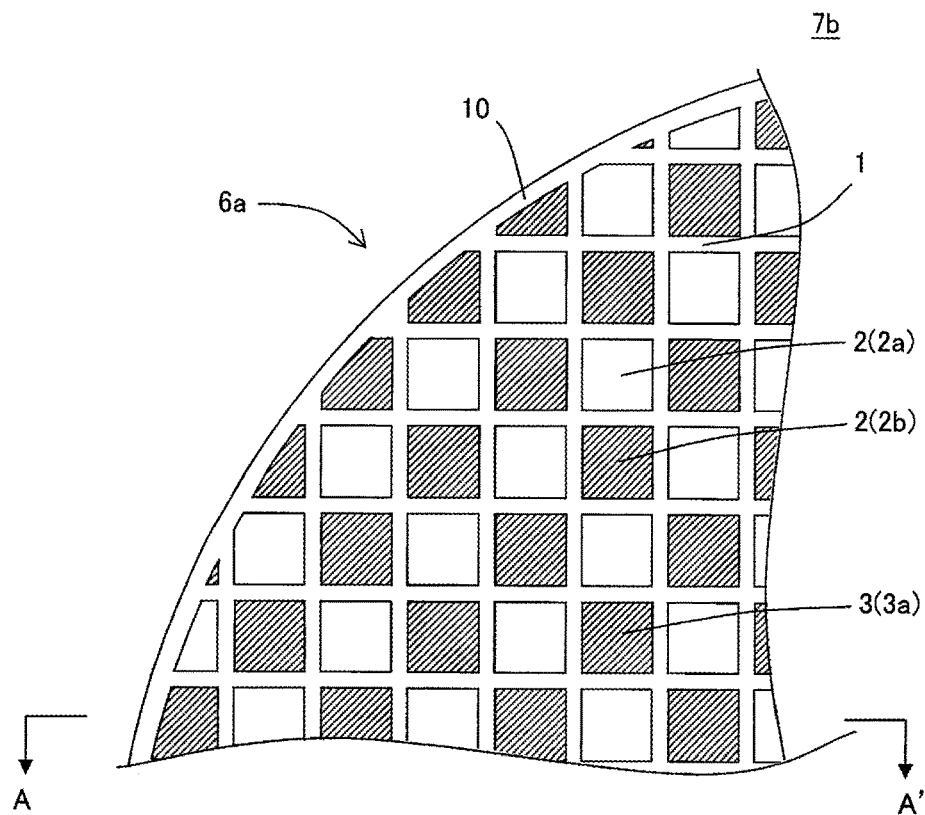
FIG. 3 is a plan view showing a part of an inflow end face of a specific circumferential region of the plugged honeycomb structure shown in FIG. 1.
Figure 4:
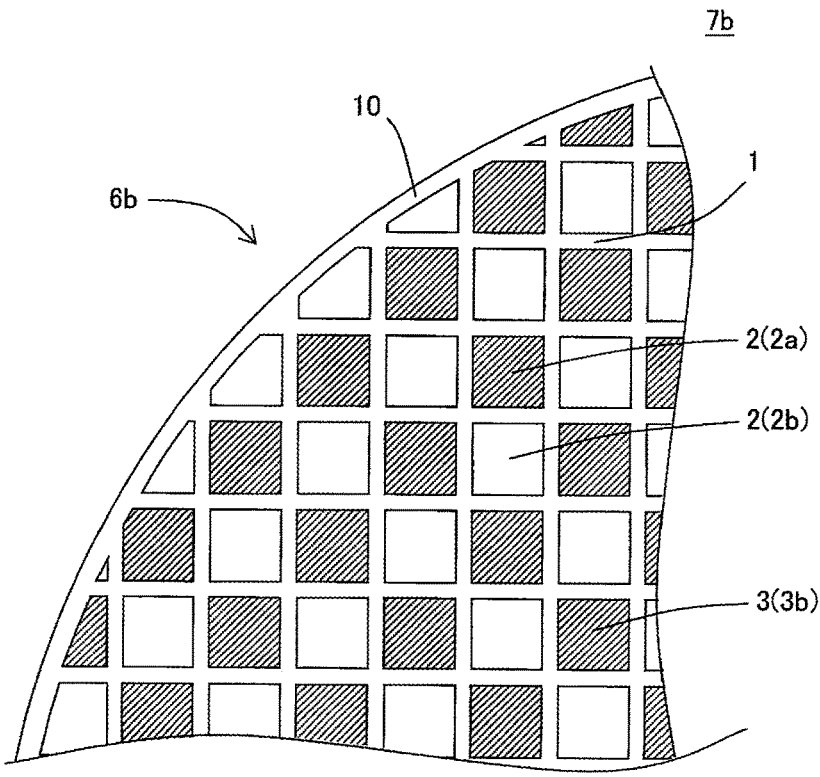
FIG. 4 is a plan view showing a part of an outflow end face of the specific circumferential region of the plugged honeycomb structure shown in FIG. 1.
Figure 5:
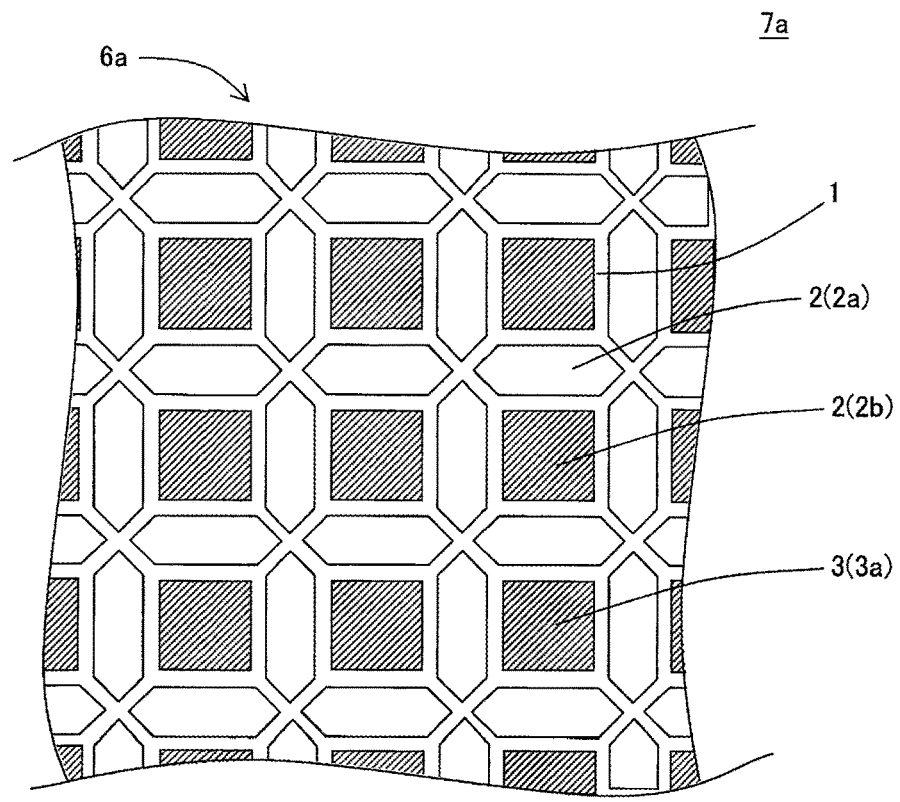
FIG. 5 is a plan view showing a part of an inflow end face of a central region of the plugged honeycomb structure shown in FIG. 1.
Figure 6:
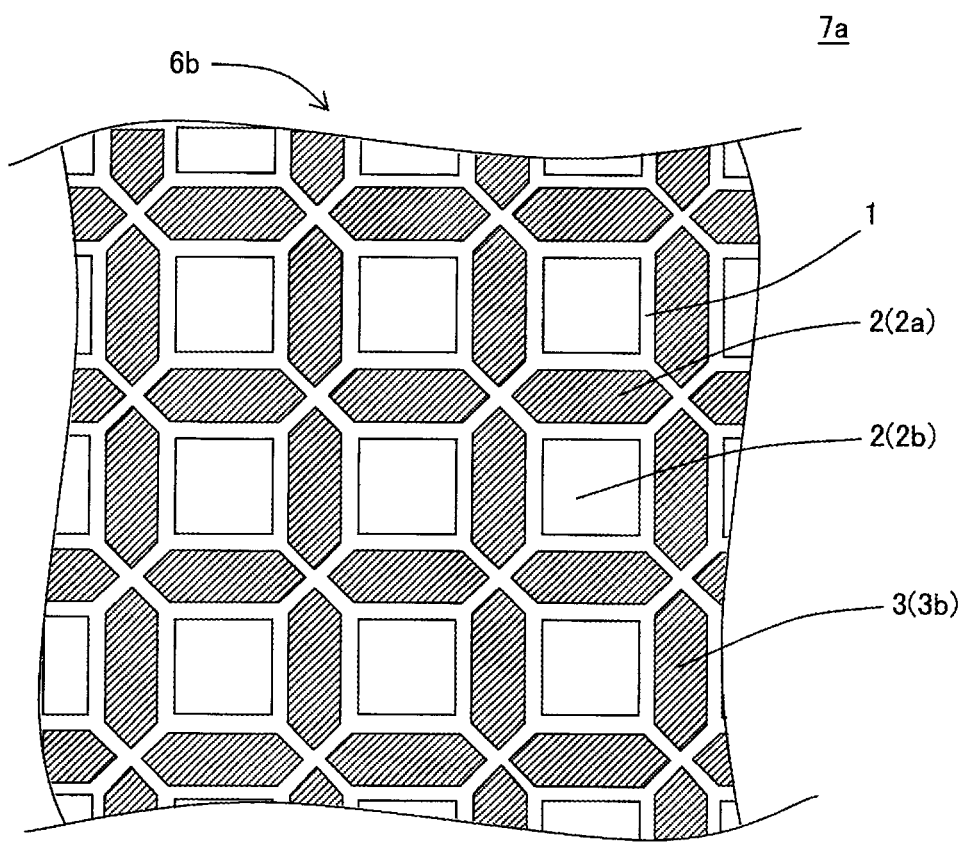
FIG. 6 is a plan view showing a part of an outflow end face of the central region of the plugged honeycomb structure shown in FIG. 1.
Figure 7:
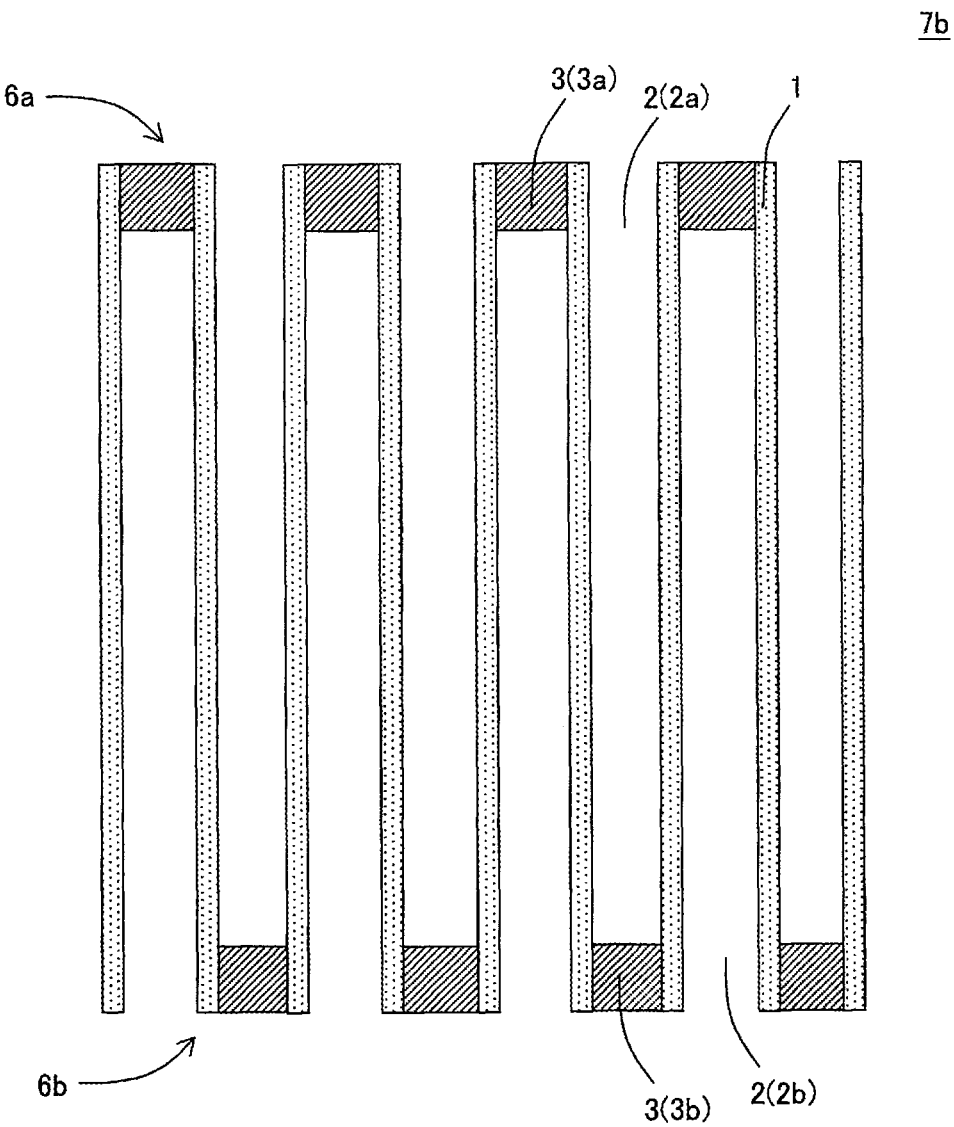
FIG. 7 is a cross-sectional view schematically showing a cross section taken along the A-A' line of FIG. 3.
Figure 8:
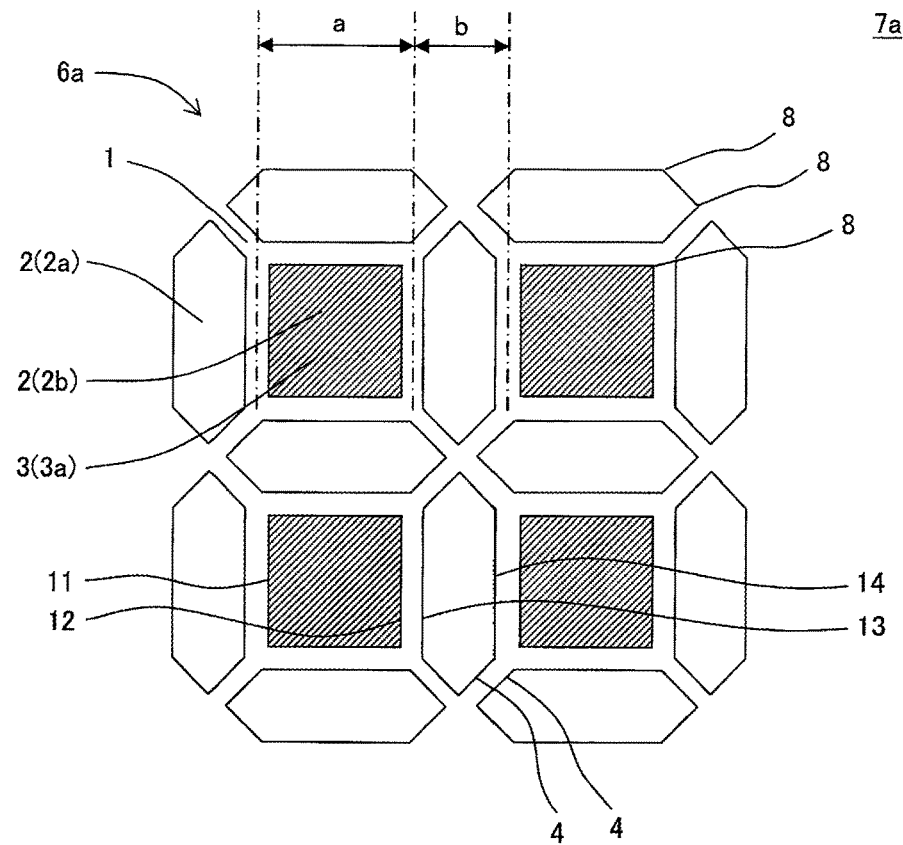
FIG. 8 is an enlarged plan view of an enlarged part of the central region shown in FIG. 5.
Figure 9:
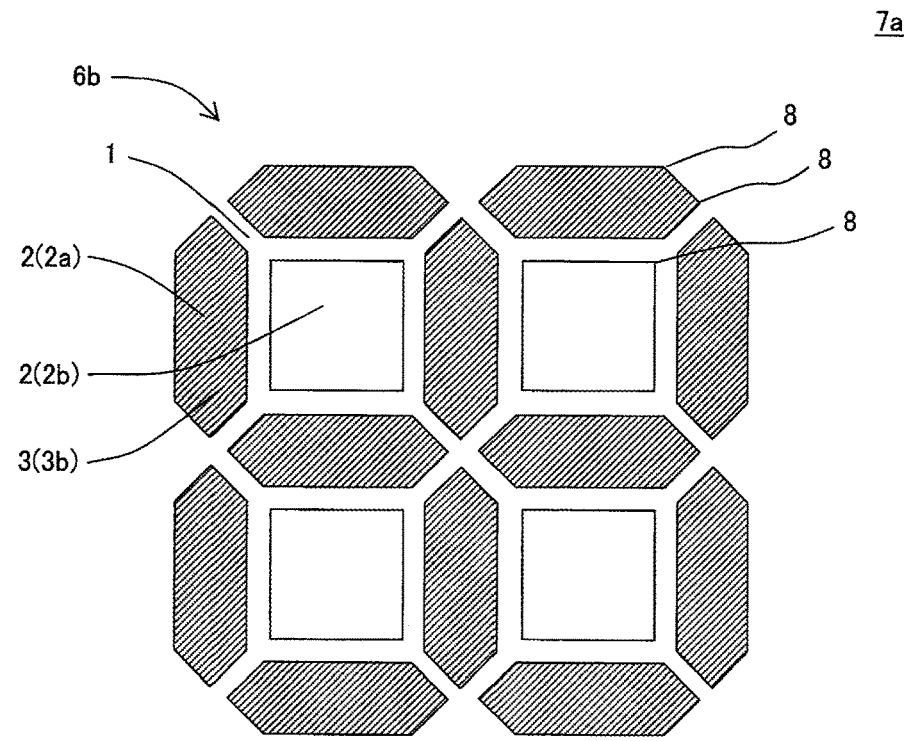
FIG. 9 is an enlarged plan view of an enlarged part of the central region shown in FIG. 6.

Here, FIG. 1 is a perspective view schematically showing the one embodiment of the plugged honeycomb structure of the present invention and seen from the inflow end face side. FIG. 2 is a plan view seen from the inflow end face side of the plugged honeycomb structure shown in FIG. 1. FIG. 3 is a plan view showing a part of an inflow end face of a specific circumferential region of the plugged honeycomb structure shown in FIG. 1. FIG. 4 is a plan view showing a part of an outflow end face of the specific circumferential region of the plugged honeycomb structure shown in FIG. 1. FIG. 5 is a plan view showing a part of an inflow end face of a central region of the plugged honeycomb structure shown in FIG. 1. FIG. 6 is a plan view showing a part of an outflow end face of the central region of the plugged honeycomb structure shown in FIG. 1. FIG. 7 is a cross-sectional view schematically showing a cross section taken along the A-A' line of FIG. 3. FIG. 8 is an enlarged plan view of an enlarged part of the central region shown in FIG. 5. FIG. 9 is an enlarged plan view of an enlarged part of the central region shown in FIG. 6.

In the honeycomb structure body 9, the porous partition walls 1 arranged to surround the plurality of cells 2 are monolithically constituted by a forming method such as extrusion. Thus, the honeycomb structure body in which the partition walls 1 constituting the honeycomb structure body 9 are constituted of a monolithic continuous structure will hereinafter be referred to as "the monolithic honeycomb structure body" sometimes. It is preferable that the plugged honeycomb structure 100 of the present embodiment is the plugged honeycomb structure 100 including this monolithic honeycomb structure body.

As shown in FIG. 1 and FIG. 2, the honeycomb structure body 9 includes the porous partition walls 1 defining the plurality of cells 2 extending from the inflow end face 6a into which the fluid flows to the outflow end face 6b from which the fluid flows out.

The honeycomb structure body 9 is constituted of a circumferential region 7b and a central region 7a. The circumferential region 7b is a region including the outermost circumference in a cross section of the honeycomb structure body 9 which is perpendicular to an extending direction of the cells 2. The central region 7a is a central portion in the cross section excluding the circumferential region 7b. It is to be noted that the central region 7a does not have to include a geometric center of the above-mentioned cross section as long as the central region is present on an inner side than the circumferential region 7b. However, it is preferable that the central region 7a includes the geometric center of the above-mentioned cross section.

The plugged honeycomb structure 100 of the present embodiment has important characteristics that the circumferential region 7b includes a specific circumferential region 7ba mentioned below. In the specific circumferential region 7ba, pressure loss with soot when an amount of the deposited soot is 4 g/L is higher than pressure loss with soot of the central region 7a as much as 15% or more. In other words, when the pressure loss with soot of the central region 7a is 100%, the pressure loss with soot of the specific circumferential region 7ba is 115% or more. Hereinafter, "the pressure loss with soot" simply mentioned in the present description means "the pressure loss with soot when the amount of the deposited soot is 4 g/L". Furthermore, an open frontal area of the specific circumferential region 7ba is the same as or larger than an open frontal area of the central region 7a.

The specific circumferential region 7ba is constituted so that the soot does not accumulate as compared with a region other than the specific circumferential region 7ba. Consequently, in the plugged honeycomb structure 100 of the present embodiment, a regeneration efficiency can improve as compared with a conventional plugged honeycomb structure. When the pressure loss with soot of the central region 7a is defined as 100% and when the pressure loss with soot of the specific circumferential region 7ba is smaller than 115%, a difference is hardly made in soot accumulation degree between the central region 7a and the specific circumferential region 7ba, and it is difficult to increase the regeneration efficiency. In this case, when the open frontal area of the specific circumferential region 7ba is smaller than the open frontal area of the central region 7a, the pressure loss with soot of the whole plugged honeycomb structure increases. Consequently, in the plugged honeycomb structure 100 of the present embodiment, the open frontal area of the specific circumferential region 7ba is the same as or larger than the open frontal area of the central region 7a, to inhibit the increase of the pressure loss with soot of the whole plugged honeycomb structure.

The pressure loss with soot of the specific circumferential region 7ba is higher than the pressure loss with soot of the central region 7a as much as preferably from 15 to 50% and further preferably from 30 to 43%. According to this constitution, the regeneration efficiency can further improve.

Hereinafter, a method of measuring the pressure loss with soot of the specific circumferential region will be described. Initially, there is prepared a plugged honeycomb structure of a single cell structure similar to a cell structure of the specific circumferential region of a measurement target. Next, the prepared plugged honeycomb structure is mounted in an exhaust system of a diesel engine for a car which has a displacement of 2 L, and this diesel engine is operated to deposit the soot in the plugged honeycomb structure. It is to be noted that the diesel engine is operated at an engine rotation number of 2000 rotations/minute to obtain an exhaust temperature at 250° C. As to the plugged honeycomb structure, mass increase and the pressure loss due to the deposition of the soot are measured continuously from the start of the operation of the diesel engine. Then, the pressure loss when the amount of the soot deposited in the plugged honeycomb structure is 4 g/L is defined as the pressure loss with soot of the specific circumferential region. The amount (g/L) of the deposited soot in the present description indicates the amount (g) of the soot deposited per unit volume (L) of the plugged honeycomb structure. It is to be noted that the unit volume (L) of the plugged honeycomb structure is a volume of a portion of the plugged honeycomb structure which excludes the outer wall (including a volume of the cells).

A method of measuring the pressure loss with soot of the central region can be performed in conformity with the above-mentioned method of measuring the pressure loss with soot of the specific circumferential region. In other words, initially, there is prepared a plugged honeycomb structure of a single cell structure similar to a cell structure of the central region of a measurement target. Next, the prepared plugged honeycomb structure is used to measure the pressure loss with soot of the central region in the same manner as in the above-mentioned method of measuring the pressure loss with soot of the specific circumferential region.

In case of comparison of the pressure loss with soot of the specific circumferential region with the pressure loss with soot of the central region, as described above, the plugged honeycomb structures of the single cell structures having the same shape are used to measure the pressure loss with soot by the same method. By the comparison of the measured values of the pressure loss with soot, an increase ratio of the pressure loss with soot of the specific circumferential region to the pressure loss with soot of the central region is obtainable.

In the plugged honeycomb structure of the present embodiment, the open frontal area of the specific circumferential region is the same as or larger than the open frontal area of the central region. When the open frontal area of the central region is defined as a ratio of 100%, the open frontal area of the specific circumferential region has a ratio of preferably from 100 to 150% and further preferably from 100 to 120%. When the open frontal area of the specific circumferential region is smaller than the open frontal area of the central region, during regeneration, a temperature of a circumferential portion of the plugged honeycomb structure hardly rises, and it is difficult to increase the regeneration efficiency. The open frontal area of the specific circumferential region is obtainable as a ratio of a total area S1$a$ of inflow cells and a total area S1$b$ of outflow cells in the specific circumferential region to an area S1 of the specific circumferential region in the cross section perpendicular to the cell extending direction. In other words, the open frontal area of the specific circumferential region is obtainable in accordance with Equation (1) mentioned below. The open frontal area of the central region is obtainable as a ratio of a total area S2$a$ of inflow cells and a total area S2$b$ of outflow cells in the central region to an area S2 of the central region in the cross section perpendicular to the cell extending direction. In other words, the open frontal area of the central region is obtainable in accordance with Equation (2) mentioned below.

$$(S1a+S1b)/S1 \times 100; \quad \text{Equation (1)}$$

and $$(S2a+S2b)/S2 \times 100. \quad \text{Equation (2)}$$

As shown in FIG. 1 to FIG. 9, the plugging portion 3 is disposed in an open end of each cell 2 formed in the honeycomb structure body 9 to plug the open end of the cell 2 on the side of one of the inflow end face 6$a$ and the outflow end face 6$b$. In other words, the plugging portions 3 are arranged in the open ends of predetermined cells 2 in the inflow end face 6$a$ and the open ends of the residual cells 2 other than the predetermined cells 2 in the outflow end face 6$b$. Hereinafter, each cell 2 including the plugging portion 3 in its end portion on the outflow end face 6$b$ side of the honeycomb structure body 9 will be referred to as "an inflow cell 2$a$" sometimes. Furthermore, each cell 2 including the plugging portion 3 in the end portion of the cell 2 on the inflow end face 6$a$ side of the honeycomb structure body 9 will be referred to as "an outflow cell 2$b$" sometimes.

In the cross section of the honeycomb structure body 9 which is perpendicular to the extending direction of the cells 2, a ratio of an area of the specific circumferential region 7$ba$ is 5% or more to a total area of the honeycomb structure body 9. According to this constitution, the regeneration efficiency of the plugged honeycomb structure 100 can further improve. It is preferable that the ratio of the area of the specific circumferential region 7$ba$ is from 5 to 60%.

Figure 10:
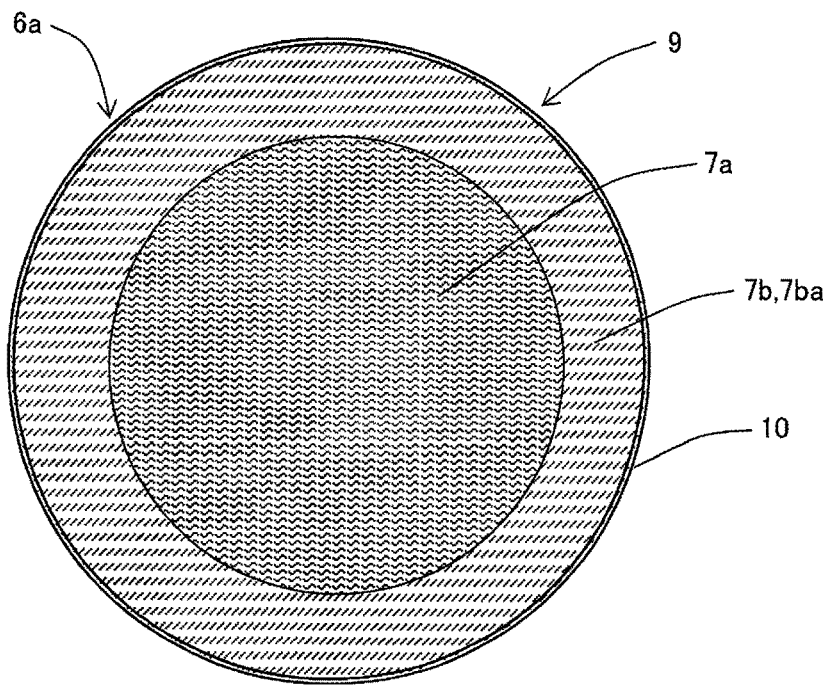
FIG. 10 is a plan view schematically showing another embodiment of the plugged honeycomb structure of the present invention and seen from an inflow end face side.

In the plugged honeycomb structure 100 shown in FIG. 1 to FIG. 9, the whole circumferential region 7$b$ excluding the central region 7$a$ in the honeycomb structure body 9 is the specific circumferential region 7$ba$. However, a region of a part of the circumferential region 7$b$ may be the specific circumferential region 7$ba$. Furthermore, in the plugged honeycomb structure 100 shown in FIG. 1 to FIG. 9, a substantially quadrangular range in a central portion of the cross section perpendicular to the extending direction of the cells 2 is the central region 7$a$, and an outer portion than the central region 7$a$ is the circumferential region 7$b$. For example, as in a plugged honeycomb structure 200 shown in FIG. 10, a round range of a central portion in a cross section perpendicular to an extending direction of cells 2 may be a central region 7$a$, and a ring-shaped portion on an outer side than the central region 7$a$ may be a circumferential region 7$b$. FIG. 10 is a plan view schematically showing another embodiment of the plugged honeycomb structure of the present invention and seen from an inflow end face side. In FIG. 10, partition walls constituting a honeycomb structure body 9, cells defined by the partition walls and plugging portions arranged in end portions of the cells are drawn in an abstract manner. In FIG. 10, constituent elements constituted similarly to those of the plugged honeycomb structure 100 shown in FIG. 1 to FIG. 9 are denoted with the same reference numerals, and the description is omitted.

In the plugged honeycomb structure 100 shown in FIG. 1 to FIG. 9, it is preferable that the region other than the specific circumferential region 7$ba$ of the honeycomb structure body 9 is constituted as follows. Here, regions other than the specific circumferential region 7$ba$ of the honeycomb structure body 9 are the central region 7$a$, and the circumferential region 7$b$ other than the specific circumferential region 7$ba$. The region other than the specific circumferential region 7$ba$ of the honeycomb structure body 9 may be the central region 7$a$ only.

In the region other than the specific circumferential region 7$ba$ of the honeycomb structure body 9, it is preferable that a shape of the inflow cells 2$a$ in the cross section perpendicular to the extending direction of the cells 2 is hexagonal. In the present description, the above-mentioned "hexagonal shape" means an after-mentioned "substantially hexagonal shape". Furthermore, it is preferable that a shape of the outflow cells 2$b$ in the cross section perpendicular to the extending direction of the cells 2 is square. In the present description, the above-mentioned "square shape" means an after-mentioned "substantially square shape". Furthermore, it is preferable that the plurality of cells 2 have a structure where four inflow cells 2$a$ surround one outflow cell 2$b$ so that one side of the predetermined inflow cell 2$a$ and one side of the adjacent outflow cell 2$b$ have the same length and are parallel to each other. In the present description, "the same length" and "parallel" mentioned above mean "about the same length" and "substantially parallel" which are mentioned later. In other words, each of four sides of the outflow cell 2$b$ having a substantially square cross-sectional shape is adjacent to one side of the inflow cell 2$a$ having a substantially hexagonal cross-sectional shape, and the adjacent sides have about the same length and are substantially parallel to each other. In this structure, the outflow cells 2$b$ are not adjacent to each other, but the whole periphery of the outflow cell 2$b$ is surrounded with four inflow cells 2$a$. According to this structure, the open frontal area of the outflow cell 2$b$ can increase, and the number of the outflow cells 2$b$ can be smaller than the number of the inflow cells 2$a$, and hence initial pressure loss can decrease.

In the present description, "the substantially hexagonal shape" means the hexagonal shape, a hexagonal shape including at least one curved corner portion, or a hexagonal shape including at least one linearly chamfered corner portion. "The substantially square shape" means the square shape, a square shape including at least one curved corner portion, or a square shape including at least one linearly chamfered corner portion. "About the same length" means the same length or a length of ±20% of the length. "Substantially parallel" means parallel, or a positional relation between two sides in a state where one of the two parallel sides is tilted in a range of ±15°.

Furthermore, as shown in FIG. 8 and FIG. 9, it is preferable that four sides 4 which exclude two sides 13 and 14 substantially parallel and adjacent to the outflow cells 2b in six sides of the inflow cell 2a are adjacent to sides 4 of the other inflow cells 2a adjacent to the outflow cells 2b, respectively. In other words, as shown in FIG. 8 and FIG. 9, it is preferable that a portion where four vertexes each of which is formed by two adjacent sides 4 in the inflow cell 2a meet one another has a structure where two partition walls 1 are perpendicular to each other. According to this structure, it is possible to maintain a high heat capacity of the partition walls 1, and it is possible to relieve thermal stress in a vertex portion in which PM is easily deposited during burning of the PM.

It is preferable that a distance a that is a distance between the partition wall 1 forming a first side 11 of the outflow cell 2b and the partition wall 1 forming a second side 12 facing the first side 11 of the outflow cell 2b is in a range in excess of 0.8 mm and smaller than 2.4 mm. Here, the distance a indicates the shortest distance connecting the center of the partition wall 1 forming the first side 11 in a thickness direction to the center of the partition wall 1 forming the facing second side 12 in the thickness direction. On the other hand, when a distance between the partition wall 1 forming a third side 13 of the inflow cell 2a which is substantially parallel and adjacent to one side of the outflow cell 2b and the partition wall 1 forming a fourth side 14 facing the third side 13 of the inflow cell 2a is defined as a distance b, a constitution mentioned below is preferable. In other words, it is preferable that a ratio of the distance b to the distance a is in a range in excess of 0.4 and smaller than 1.1. Here, the distance b indicates the shortest distance connecting the center of the partition wall 1 forming the third side 13 in the thickness direction to the center of the partition wall 1 forming the facing fourth side 14 in the thickness direction. A relation between the distance a and the distance b is adjusted in the above range, whereby the initial pressure loss and the pressure loss during the PM deposition preferably decrease with good balance.

Figure 11:
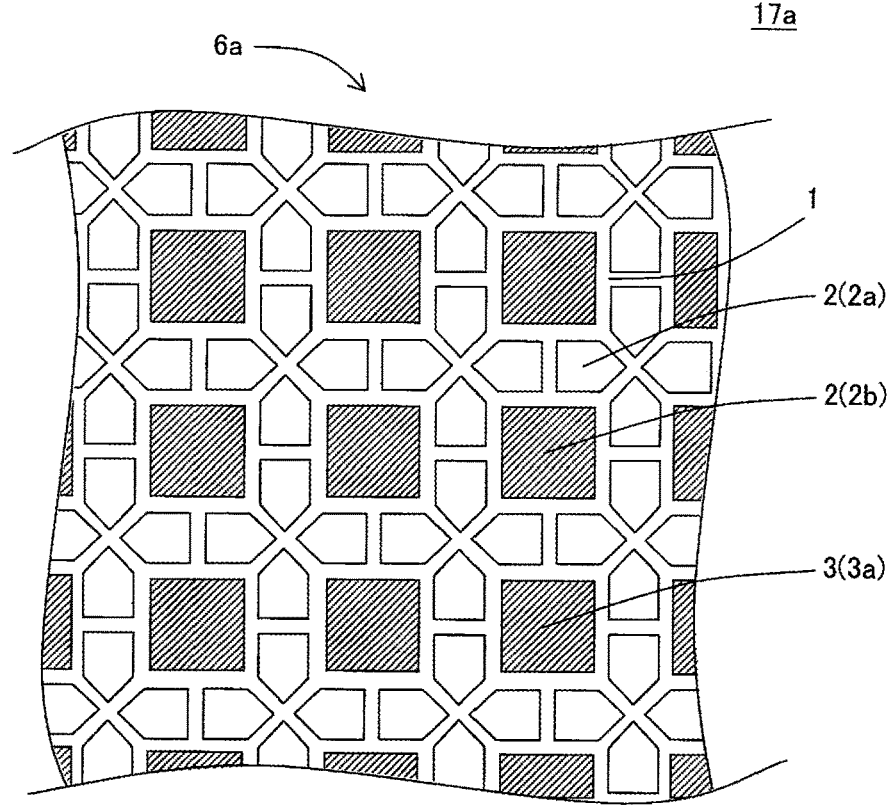
FIG. 11 is a plan view showing a part of an inflow end face of a central region in still another embodiment of the plugged honeycomb structure of the present invention.
Figure 12:
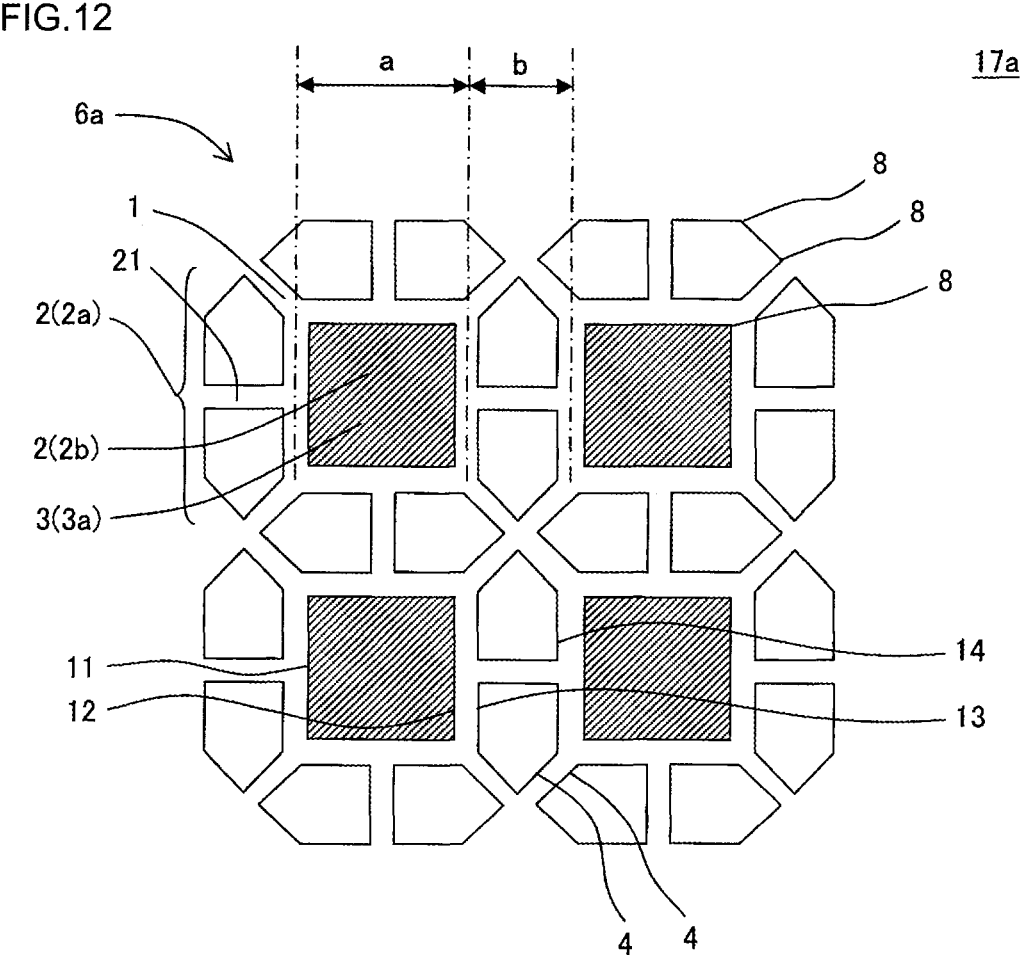
FIG. 12 is an enlarged plan view of an enlarged part of the central region shown in FIG. 11.

Furthermore, the region other than the specific circumferential region 7ba of the honeycomb structure body 9 may be constituted as in, for example, a central region 17a shown in FIG. 11 and FIG. 12. FIG. 11 is a plan view showing a part of an inflow end face of the central region in still another embodiment of the plugged honeycomb structure of the present invention. FIG. 12 is an enlarged plan view of an enlarged part of the central region shown in FIG. 11. An inflow cell 2a in the central region 17a shown in FIG. 11 and FIG. 12 may further include a dividing wall 21 connecting a central portion of a third side to a central portion of a fourth side in a direction perpendicular to the extending direction of the cells 2. The inflow cell 2a is divided into two spaces each having a substantially pentagonal cross-sectional shape by the dividing wall 21.

There are not any special restrictions on a material of the dividing wall 21, and a preferable material is suitably selectable from porous materials having a filtration ability. In view of easiness during preparation, it is preferable to employ the same material as in the partition walls 1. Furthermore, there are not any special restrictions on a thickness of the dividing wall 21, but from the viewpoints of the heat capacity and strength, it is preferable that the thickness is in a range of 0.1 to 0.5 mm. When the thickness is smaller than 0.1 mm, the thickness is unfavorable from the viewpoints of the heat capacity and strength. Furthermore, when the thickness is larger than 0.5 mm, the thickness is unfavorable from the viewpoint of acquisition of a filtration area. It is to be noted that in the present description, even when the dividing wall 21 is formed, it is considered that the inflow cell 2a is "apparently" substantially hexagonal.

As shown in FIG. 1 to FIG. 9, it is preferable that in the specific circumferential region 7ba of the honeycomb structure body 9, shapes of the cells 2 in the cross section perpendicular to the extending direction of the cells 2 are quadrangular or are different between the inflow cell 2a and the outflow cell 2b. This constitution is preferable from the viewpoint of acquisition of a volume to deposit ash in an exhaust gas and in that pressure loss with deposited soot of the circumferential region is suitably higher than that of the central region. Examples of circumstances where the shapes of the cells 2 are different between the inflow cell 2a and the outflow cell 2b include circumstances where the shape of the inflow cell 2a is quadrangular and the shape of the outflow cell 2b is octagonal.

There are not any special restrictions on the whole shape of the plugged honeycomb structure 100. For example, the whole shape of the plugged honeycomb structure 100 shown in FIG. 1 is a round pillar shape including the inflow end face 6a and the outflow end face 6b which are round. Additionally, although not shown in the drawing, the whole shape of the plugged honeycomb structure may be a pillar shape including the inflow end face and outflow end face which have a substantially round shape such as an elliptic shape, a racetrack shape or an oblong shape. Alternatively, the whole shape of the plugged honeycomb structure may be a prismatic columnar shape including the inflow end face and outflow end face which have a polygonal shape such as a quadrangular shape or a hexagonal shape.

There are not any special restrictions on a material constituting the honeycomb structure body 9 (in other words, a material constituting the partition walls), but from the viewpoints of strength, heat resistance, durability and the like, it is preferable that a main component is any oxide or non-oxide ceramic, a metal or the like. Specifically, it is considered that examples of ceramic include cordierite, mullite, alumina, spinel, silicon carbide, silicon nitride, and aluminum titanate. It is considered that examples of the metal include a Fe—Cr—Al based metal and metal silicon. It is preferable that the main component is one or at least two selected from these materials. From the viewpoints of high strength, high heat resistance and the like, it is especially preferable that the main component is one or at least two selected from the group consisting of alumina, mullite, aluminum titanate, cordierite, silicon carbide and silicon nitride. Furthermore, from the viewpoints of high thermal conductivity, high heat resistance and the like, silicon carbide or a silicon-silicon carbide composite material is especially suitable. Here, "the main component" means a component constituting 50 mass % or more, preferably 70 mass % or more, and further preferably 80 mass % or more of the honeycomb structure body.

In the honeycomb structure body, the specific circumferential region may be different from the region other than the specific circumferential region in, for example, a material constituting the partition walls. According to the hitherto described present embodiment, one honeycomb structure partially has a different cell shape, and hence the pressure loss with soot of each region varies, but by use of, for example, different materials constituting the partition walls, the pressure loss with soot of each region may change. However, it is preferable that in the honeycomb structure body, the circumferential region and the central region are made of the same material. Furthermore, it is further preferable that in the honeycomb structure body, the circumferential region and the central region are monolithically constituted by the same material mentioned above.

Furthermore, in the honeycomb structure body, when the specific circumferential region is different from the region other than the specific circumferential region in partition wall porosity and pore diameters, it is possible to adjust a value of the pressure loss with soot. However, in case of adjusting the value of the pressure loss with soot in accordance with the porosity and pore diameters of the partition walls, the pressure loss of the whole plugged honeycomb structure might be likely to increase. Furthermore, deterioration of thermal shock resistance (robust properties) of the plugged honeycomb structure might occur. Consequently, as to the specific circumferential region and the region other than the specific circumferential region, it is preferable to adjust the open frontal areas of the inflow cells to the same value or comparatively close values, and it is preferable to adjust the value of the pressure loss with soot in accordance with the cell structure of the honeycomb structure body.

There are not any special restrictions on a material of the plugging portions. It is preferable that the material of the plugging portions includes one or at least two selected from the group consisting of various ceramics and the metal which are the above-mentioned examples of the preferable material of the honeycomb structure body.

Furthermore, in one preferable example of the plugged honeycomb structure of the present embodiment, the central region and/or the circumferential region in the honeycomb structure body is constituted as mentioned below. In the inflow cells, a geometric surface area (GSA) is preferably from 10 to 30 $cm^2/cm^3$ and further preferably from 12 to 18 $cm^2/cm^3$. Here, the above-mentioned "geometric surface area (GSA)" is a value (S/V) obtained by dividing a total inner surface area (S) of the inflow cells in each region by a total volume (V) of the corresponding region of the honeycomb structure body. In general, the larger the filtration area of a filter is, the more a thickness of PM deposited in the partition walls can decrease. Therefore, the geometric surface area (GSA) is adjusted in the above-mentioned numeric range, whereby it is possible to minimize the pressure loss of the plugged honeycomb structure. Consequently, when the geometric surface area (GSA) of the inflow cells is smaller than 10 $cm^2/cm^3$, the pressure loss during the PM deposition unfavorably increases. On the other hand, when the GSA is larger than 30 $cm^2/cm^3$, the initial pressure loss unfavorably increases.

In the plugged honeycomb structure of the present embodiment, a hydraulic diameter of each of the plurality of cells 2 is preferably from 0.5 to 2.5 mm and further preferably from 0.8 to 2.2 mm. When the hydraulic diameter of each of the plurality of cells is smaller than 0.5 mm, the initial pressure loss unfavorably increases. On the other hand, when the hydraulic diameter of each of the plurality of cells is larger than 2.5 mm, a contact area of the exhaust gas with the partition walls decreases, and a purification efficiency unfavorably deteriorates. Here, the hydraulic diameter of each of the plurality of cells is a value calculated in accordance with 4×(sectional area)/(circumferential length) based on the sectional area and circumferential length of each cell. The sectional area of the cell indicates an area of the shape (the sectional shape) of each cell appearing in a cross section of the plugged honeycomb structure which is vertical to a central axis direction, and the circumferential length of the cell indicates a length of a circumference of the sectional shape of the cell (a length of a closed line surrounding the cross section).

In view of trade-off among the initial pressure loss, the pressure loss during the PM deposition, and a trapping efficiency, it is preferable that the plugged honeycomb structure of the present embodiment simultaneously satisfies the conditions that the geometric surface area (GSA) of the inflow cells is from 10 to 30 $cm^2/cm^3$ and that the ratio of the open frontal area of each inflow cell is from 20 to 70% and that the hydraulic diameter of each of the plurality of cells is from 0.5 to 2.5 mm. Furthermore, it is further preferable to simultaneously satisfy the conditions that the geometric surface area (GSA) of the inflow cells is from 12 to 18 $cm^2/cm^3$ and that the ratio of the open frontal area of each inflow cell is from 25 to 65% and that the hydraulic diameter of each of the plurality of cells is from 0.8 to 2.2 mm.

In the plugged honeycomb structure of the present embodiment, a catalyst may be loaded onto the partition walls forming the plurality of cells. The loading of the catalyst onto the partition walls means coating of the surfaces of the partition walls and inner walls of pores formed in the partition walls with the catalyst. Examples of a type of catalyst include an SCR catalyst (zeolite, titania and vanadium), and a three-way catalyst containing at least two noble metals selected from the group consisting of Pt, Rh and Pd and at least one selected from the group consisting of alumina, ceria and zirconia. Thus, the catalyst is loaded, whereby it is possible to detoxify $NO_x$, CO, HC and the like included in the exhaust gas emitted from a direct injection type gasoline engine, the diesel engine or the like, and it is also possible to easily burn and remove the PM deposited on the surfaces of the partition walls by a catalytic function.

In the plugged honeycomb structure of the present embodiment, there are not any special restrictions on a method of loading such a catalyst as described above, and a method usually performed by the person skilled in the art is employable. Specifically, an example of the method is a method of wash-coating the structure with a catalyst slurry and then performing drying and firing.

(2) Manufacturing Method of Plugged Honeycomb Structure:

There are not any special restrictions on a manufacturing method of the plugged honeycomb structure of the present embodiment shown in FIG. 1 to FIG. 9, and the plugged honeycomb structure can be manufactured by, for example, a method mentioned below. Initially, a plastic kneaded material to prepare the honeycomb structure body is prepared. The kneaded material to prepare the honeycomb structure body can be prepared by suitably adding an additive such as a binder and water to a material selected as raw material powder from the above-mentioned suitable material of the honeycomb structure body. As the raw material powder, for example, silicon carbide powder is usable. Examples of the binder include methylcellulose and hydroxypropyl methylcellulose. Furthermore, another example of the additive is a surfactant.

Next, the kneaded material obtained in this manner is extruded to prepare a honeycomb formed body having partition walls defining a plurality of cells and an outer wall disposed to surround the partition walls. During the preparation of the honeycomb formed body, it is preferable to prepare the honeycomb formed body so that a region forming the specific circumferential region is different from the region other than the specific circumferential region in cell structure. Furthermore, for example, a raw material of the kneaded material for use in the extrusion may be changed in the region forming the specific circumferential region and the region other than the specific circumferential region.

Each obtained honeycomb formed body is dried with, for example, microwaves and hot air, and open ends of the cells are plugged with a material similar to the material used in preparing the honeycomb formed body, to prepare the plugging portions. The honeycomb formed body may further be dried after the plugging portions are prepared.

Next, the honeycomb formed body including the prepared plugging portions is fired, to manufacture the plugged honeycomb structure. A firing temperature and a firing atmosphere vary with the raw materials, and the person skilled in the art can select the firing temperature and the firing atmosphere which are optimum for the selected material.

EXAMPLES

Example 1

As a ceramic raw material, a cordierite forming raw material was used, and to 100 parts by mass of cordierite forming raw material, a pore former, a dispersing medium, an organic binder and a dispersing agent were added, mixed and kneaded to prepare a kneaded material.

Next, the obtained kneaded material was extruded by using an extruder, to prepare a honeycomb formed body. In a die used for the extrusion, a circumferential region of the honeycomb formed body was different from a central region thereof in shape of slits to be formed in partition walls. The central region of the honeycomb formed body had a cell arrangement pattern similar to that of the central region shown in FIG. 12. On the other hand, the circumferential region of the honeycomb formed body had an arrangement pattern in which quadrangular cells and octagonal cells were alternately arranged.

Next, the obtained honeycomb formed body was dried by high frequency induction heating, and then further dried by using a hot air drier.

Plugging portions were formed in the dried honeycomb formed body. Initially, an inflow end face of the honeycomb formed body was masked. Next, a masked end portion (the end portion on the side of the inflow end face) was immersed into a plugging slurry to charge the plugging slurry into open ends of cells (outflow cells) which were not masked. Thus, the plugging portions were formed on the inflow end face side of the honeycomb formed body. Afterward, an outflow end face of the dried honeycomb formed body was similarly masked and immersed, to form plugging portions also in inflow cells.

Then, the honeycomb formed body including the formed plugging portions was degreased and fired to manufacture a plugged honeycomb structure. As to degreasing conditions, the degreasing was performed at 500° C. for 1 hour, and as to firing conditions, the firing was performed at 1420° C. in oxidation atmosphere for 1 hour. In the plugged honeycomb structure of Example 1, a diameter of each end face was 144 mm, and a length in a cell extending direction was 152 mm.

Table 1 shows, in columns of "configurations" of a central region and a circumferential region, the configurations of the central region and circumferential region of the plugged honeycomb structure of Example 1. It is to be noted that when Table 1 shows a drawing number such as FIG. 12 in the column of "configuration", it is meant that the cell arrangement pattern of the plugged honeycomb structure has a structure shown in the corresponding drawing. Furthermore, when Table 1 shows shapes such as "quadrangular and octagonal" shapes in the column of "configuration", it is meant that the cell arrangement pattern of the plugged honeycomb structure has the described configuration.

TABLE 1

| | Central region | | | | | Circumferential region | | | | |
|---|---|---|---|---|---|---|---|---|---|---|
| | Configuration | Partition wall thickness (mm) | Cell density (cells/cm$^2$) | Open frontal area C (%) | Pressure loss with soot A (Ratio) | Configuration | Partition wall thickness (mm) | Cell density (cells/cm$^2$) | Open frontal area D (%) | Pressure loss with soot B (Ratio) |
| Comparative Example 1 | Quadrangular and octagonal | 0.28 | 46.5 | 64 | 1 | Quadrangular and octagonal | 0.28 | 46.5 | 64 | 1 |
| Comparative Example 2 | Quadrangular and octagonal | 0.29 | 31 | 64 | 1 | Square | 0.28 | 46.5 | 64 | 1.1 |
| Comparative Example 3 | Quadrangular and octagonal | 0.4 | 46.5 | 64 | 1 | Quadrangular and octagonal | 0.4 | 46.5 | 58 | 1.4 |
| Comparative Example 4 | FIG. 12 | 0.34 | 31 | 64 | 0.7 | Quadrangular and octagonal | 0.4 | 46.5 | 58 | 1.3 |
| Comparative Example 5 | FIG. 8 | 0.29 | 46.5 | 64 | 0.75 | Quadrangular and octagonal | 0.4 | 46.5 | 58 | 1.2 |
| Comparative Example 6 | FIG. 12 | 0.34 | 31 | 64 | 0.7 | Quadrangular and octagonal | 0.4 | 46.5 | 64 | 1.3 |
| Comparative Example 7 | FIG. 12 | 0.34 | 31 | 64 | 0.7 | Quadrangular and octagonal | 0.4 | 46.5 | 64 | 1.3 |
| Example 1 | FIG. 12 | 0.34 | 31 | 64 | 0.7 | Quadrangular and octagonal | 0.28 | 46.5 | 64 | 1 |
| Example 2 | FIG. 12 | 0.34 | 31 | 64 | 0.7 | Quadrangular and octagonal | 0.28 | 46.5 | 64 | 1 |
| Example 3 | FIG. 12 | 0.34 | 31 | 64 | 0.7 | Quadrangular and octagonal | 0.28 | 46.5 | 64 | 1 |
| Example 4 | FIG. 12 | 0.34 | 31 | 64 | 0.7 | Quadrangular and octagonal | 0.28 | 46.5 | 64 | 1 |
| Example 5 | FIG. 12 | 0.34 | 31 | 64 | 0.7 | Quadrangular and octagonal | 0.28 | 46.5 | 64 | 1 |
| Example 6 | FIG. 12 | 0.34 | 31 | 64 | 0.7 | Quadrangular and octagonal | 0.28 | 46.5 | 64 | 1 |
| Example 7 | FIG. 8 | 0.29 | 31 | 64 | 0.75 | Quadrangular and octagonal | 0.28 | 46.5 | 64 | 1 |
| Example 8 | FIG. 8 | 0.29 | 31 | 64 | 0.75 | Square | 0.28 | 46.5 | 64 | 1.1 |
| Example 9 | FIG. 12 | 0.25 | 31 | 69 | 0.65 | Square | 0.25 | 46.5 | 69 | 0.9 |

TABLE 1-continued

| | | Central region | | | | Circumferential region | | | |
|---|---|---|---|---|---|---|---|---|---|
| | Configuration | Partition wall thickness (mm) | Cell density (cells/cm$^2$) | Open frontal area C (%) | Pressure loss with soot A (Ratio) | Configuration | Partition wall thickness (mm) | Cell density (cells/cm$^2$) | Open frontal area D (%) | Pressure loss with soot B (Ratio) |
| Example 10 | FIG. 8 | 0.25 | 31 | 69 | 0.65 | Square | 0.25 | 46.5 | 69 | 0.9 |
| Example 11 | FIG. 12 | 0.38 | 31 | 61 | 0.75 | Square | 0.25 | 46.5 | 69 | 0.9 |
| Example 12 | FIG. 12 | 0.35 | 31 | 61 | 0.78 | Square | 0.25 | 46.5 | 69 | 0.9 |

TABLE 2

| | | | | Evaluation result | | |
|---|---|---|---|---|---|---|
| | Internal/external pressure loss ratio B/A (Ratio) | Internal/external open frontal area ratio D/C (Ratio) | Circumferential portion area ratio (%) | Total pressure loss (Ratio) | Regeneration efficiency (%) | General evaluation |
| Comparative Example 1 | 1.00 | 1.00 | — | 1 | 51 | NG |
| Comparative Example 2 | 1.10 | 1.00 | 50 | 1.05 | 54 | NG |
| Comparative Example 3 | 1.40 | 0.91 | — | 1.2 | 61 | NG |
| Comparative Example 4 | 1.86 | 0.91 | 50 | 1.25 | 66 | NG |
| Comparative Example 5 | 1.60 | 0.91 | 50 | 1.18 | 65 | NG |
| Comparative Example 6 | 1.86 | 1.00 | 1 | 1.01 | 66 | NG |
| Comparative Example 7 | 1.86 | 1.00 | 3 | 1.02 | 66 | NG |
| Example 1 | 1.43 | 1.00 | 5 | 0.73 | 72 | OK |
| Example 2 | 1.43 | 1.00 | 9 | 0.76 | 73 | OK |
| Example 3 | 1.43 | 1.00 | 15.3 | 0.78 | 75 | OK |
| Example 4 | 1.43 | 1.00 | 21.6 | 0.8 | 78 | OK |
| Example 5 | 1.43 | 1.00 | 27.9 | 0.83 | 81 | OK |
| Example 6 | 1.43 | 1.00 | 50 | 0.85 | 83 | OK |
| Example 7 | 1.33 | 1.00 | 50 | 0.9 | 87 | OK |
| Example 8 | 1.47 | 1.00 | 50 | 0.9 | 89 | OK |
| Example 9 | 1.38 | 1.00 | 50 | 0.85 | 93 | OK |
| Example 10 | 1.38 | 1.00 | 50 | 0.85 | 91 | OK |
| Example 11 | 1.20 | 1.13 | 50 | 0.85 | 77 | OK |
| Example 12 | 1.15 | 1.13 | 50 | 0.85 | 72 | OK |

Comparative Example 1

In Comparative Example 1, by use of a kneaded material prepared similarly to the kneaded material used in the preparation of the honeycomb formed body of Example 1, there was prepared a honeycomb formed body having an arrangement pattern in which quadrangular cells and octagonal cells were alternately arranged. In other words, the honeycomb formed body was prepared in Comparative Example 1 so that the whole honeycomb formed body obtained the arrangement pattern in which the quadrangular cells and octagonal cells were alternately arranged as described in the column of "configuration" of Table 1. The procedure of Example 1 was repeated except that this honeycomb formed body was prepared, to prepare a plugged honeycomb structure.

Examples 2 to 12 and Comparative Examples 2 to 7

The procedure of Example 1 was repeated except that configurations and the like of central regions and circumferential regions were changed as shown in Table 1, to prepare plugged honeycomb structures of Examples 2 to 12 and Comparative Examples 2 to 7.

As to each of the plugged honeycomb structures of Examples 1 to 12 and Comparative Examples 1 to 7, "a pressure loss with soot when an amount of the deposited soot was 4 g/L" was measured by the following method. In the measurement of "the pressure loss with soot when the amount of the deposited soot was 4 g/L", there were performed three types of measurements, i.e., the measurement only in the central regions, the measurement only in the circumferential regions, and the measurement in the whole plugged honeycomb structures as described below.

A method of measuring the pressure loss with soot of the circumferential region will be described. Initially, there was prepared a plugged honeycomb structure having a cell structure similar to a cell structure of the circumferential region. Next, the prepared plugged honeycomb structure was mounted in an exhaust system of a diesel engine for a car having a displacement of 2 L, and this diesel engine was operated, to deposit the soot in the plugged honeycomb structure. The diesel engine was operated at an engine rotation number of 2000 rotations/minute to obtain an exhaust temperature at 250° C. From the start of the operation of the diesel engine, a mass increase due to the deposition of the soot and the pressure loss were continuously measured, and the pressure loss when the amount of the deposited soot was 4 g/L was obtained as the pressure loss with soot of the circumferential region.

A method of measuring the pressure loss with soot of the central region will be described. Initially, there was prepared a plugged honeycomb structure having a cell structure similar to a cell structure of the central region. Afterward, the pressure loss with soot of the prepared plugged honeycomb structure was measured in the same manner as in the above-mentioned method of measuring the pressure loss with soot of the circumferential region, and the measured pressure loss was the pressure loss with soot of the central region.

As the pressure loss with soot of the whole plugged honeycomb structure, the pressure loss with soot was measured by using each of the plugged honeycomb structures prepared in the respective examples and comparative examples in the same manner as in the above-mentioned method of measuring the pressure loss with soot of the circumferential region.

Table 1 shows, in a column of "pressure loss with soot A (ratio)" in the central region, a ratio of "the pressure loss with soot" of the central region of each of the examples and comparative examples when a value of the pressure loss with soot of the central region of Comparative Example 1 is "1". Table 1 shows, in a column of "pressure loss with soot B (ratio)" in the circumferential region, a ratio of "the pressure loss with soot" of the circumferential region of each of the examples and comparative examples when a value of the pressure loss with soot of the circumferential region of Comparative Example 1 is "1". Table 2 shows, in a column of "total pressure loss (ratio)", a ratio of "the pressure loss with soot" of each of the whole plugged honeycomb structures of the respective examples and comparative examples when a value of the pressure loss with soot of the whole plugged honeycomb structure of Comparative Example 1 is "1".

Table 2 shows, in a column of "an internal/external pressure loss ratio B/A", a ratio of "the pressure loss with soot B (ratio)" to "the pressure loss with soot A (ratio)". Table 2 shows, in a column of "an internal/external open frontal area ratio D/C", a ratio of "an open frontal area D (%)" to "an open frontal area C (%)". Table 2 shows, in a column of "circumferential region area ratio", a ratio of an area of the specific circumferential region to a total area of a honeycomb structure body in a cross section perpendicular to a cell extending direction.

As to each of the plugged honeycomb structures of Examples 1 to 12 and Comparative Examples 1 to 7, a regeneration efficiency was measured by the following method. Furthermore, general evaluation was carried out on the basis of the measurement results of this regeneration efficiency by the following method. Table 2 shows the results.

(Regeneration Efficiency)

In a state where 6 g/L of soot was deposited to the partition walls of the plugged honeycomb structure, a high-temperature gas was passed from an inflow end face of the plugged honeycomb structure, to perform forced regeneration of the plugged honeycomb structure in which the soot was deposited. As to conditions of the forced regeneration, a gas temperature in the inflow end face was adjusted at 650° C., and a gas passing time was set to 15 minutes. Furthermore, a mass of the plugged honeycomb structure in which the soot was deposited was measured prior to the forced regeneration. After the forced regeneration, the mass of the plugged honeycomb structure was measured, and a mass of the soot lost by the forced regeneration was obtained. The regeneration efficiency (M2/M1×100) during the forced regeneration was obtained from a mass M1 of the deposited soot and a mass M2 of the soot lost by the forced regeneration. Table 2 shows the regeneration efficiency during the forced regeneration as "regeneration efficiency (%)".

(General Evaluation)

An example where "the total pressure loss (ratio)" of Table 2 was 1 or less and "the regeneration efficiency (%)" of the table was 70% or more was evaluated as "pass". When the general evaluation is "pass", Table 2 shows "OK" in a column of "general evaluation". An example where "the total pressure loss (ratio)" of Table 2 was in excess of 1 or "the regeneration efficiency (%)" of the table was smaller than 70% was evaluated as "failure". When the general evaluation is "failure", Table 2 shows "NG" in the column of "general evaluation".

(Result)

In each of the plugged honeycomb structures of Examples 1 to 12, "the total pressure loss (ratio)" was 1 or less, "the regeneration efficiency (%)" was 70% or more, and in the general evaluation, it was possible to obtain the evaluation of "pass". On the other hand, in each of the plugged honeycomb structures of Comparative Examples 2 to 7, "the total pressure loss (ratio)" was in excess of 1, and the regeneration efficiency was low.

A plugged honeycomb structure of the present invention is utilizable as a trapping filter to remove particulates and the like included in an exhaust gas.

DESCRIPTION OF REFERENCE NUMERALS

1: partition wall, 2: cell, 2a: inflow cell, 2b: outflow cell, 3: plugging portion, 3a; inflow side plugging portion, 3b: outflow side plugging portion, 4: side, 6a: inflow end face, 6b: outflow end face, 7a and 17a: central region, 7b: circumferential region, 7ba: specific circumferential region, 8: corner portion, 9: honeycomb structure body, 10: outer wall, 11: first side, 12: second side, 13: third side, 14: fourth side, 21: dividing wall, 100 and 200: plugged honeycomb structure, a: distance a, and b: distance b.

What is claimed is:

1. A plugged honeycomb structure comprising:
a pillar-shaped honeycomb structure body having porous partition walls arranged to surround a plurality of cells extending from an inflow end face to an outflow end face and forming through channels for a fluid; and
plugging portions each of which is disposed in an end portion of the cell on the side of one of the inflow end face and the outflow end face,
wherein the honeycomb structure body is constituted of a circumferential region including the outermost circumference in a cross section of the honeycomb structure body which is perpendicular to an extending direction of the cells, and a central region disposed in a central portion of the cross section excluding the circumferential region,
the circumferential region includes a specific circumferential region in which a pressure loss is at least 15% higher than a pressure loss of the central region when 4 g/L of soot is deposited in the circumferential region and the central region, and in which an open frontal area of the circumferential region is the same as or larger than an open frontal area of the central region, and
in the cross section of the honeycomb structure body which is perpendicular to the cell extending direction, a ratio of an area of the specific circumferential region is 5% or more to a total area of the honeycomb structure body.

2. The plugged honeycomb structure according to claim 1, wherein the cells including the plugging portions arranged in the end portions on the outflow end face side are defined as inflow cells, and the cells including the plugging portions arranged in the end portions on the inflow end face side are defined as outflow cells, and in a region other than the specific circumferential region of the honeycomb structure body, a shape of the inflow cells in the cross section perpendicular to the cell extending direction is hexagonal, a shape of the outflow cells in the cross section perpendicular to the cell extending direction is square, the plurality of cells have a structure in which four inflow cells surround one outflow cell so that one side of the predetermined inflow cell and one side of the adjacent outflow cell have the same length and are disposed in parallel with each other, a distance a, that is a distance between the partition wall forming a first side of the outflow cell and the partition wall forming a second side facing the first side of the outflow cell is in a range in excess of 0.8 mm and smaller than 2.4 mm, a distance b, is a distance between the partition wall forming a third side of the inflow cell parallel and adjacent to the one side of the outflow cell and the partition wall forming a fourth side facing the third side of the inflow cell, and a ratio of the distance b to the distance a is in a range in excess of 0.4 and smaller than 1.1.

3. The plugged honeycomb structure according to claim 2, wherein the inflow cell in the region other than the specific circumferential region of the honeycomb structure body further includes a dividing wall connecting a central portion of the third side to a central portion of the fourth side in a direction perpendicular to the cell extending direction.

4. The plugged honeycomb structure according to claim 2, wherein the region other than the specific circumferential region of the honeycomb structure body is the central region.

5. The plugged honeycomb structure according to claim 2, wherein in the specific circumferential region of the honeycomb structure body, shapes of the cells in the cross section perpendicular to the cell extending direction are quadrangular or are different between the inflow cell and the outflow cell.

6. The plugged honeycomb structure according to claim 1 wherein in the honeycomb structure body, the circumferential region and the central region are made of the same material.

7. The plugged honeycomb structure according to claim 6, wherein in the honeycomb structure body, the circumferential region and the central region are monolithically constituted by the same material.

\* \* \* \* \*